United States Patent [19]

Murasugi

[11] Patent Number: 4,974,710
[45] Date of Patent: Dec. 4, 1990

[54] LOCK-UP TORQUE CONVERTER WITH AN IMPROVED CLUTCH-SLIP CONTROL ARRANGEMENT

[75] Inventor: Takashi Murasugi, Yokohama, Japan
[73] Assignee: Nissan Motor Company, Limited, Yokohama, Japan
[21] Appl. No.: 717,114
[22] Filed: Mar. 28, 1985
[30] Foreign Application Priority Data Apr. 4, 1984 [JP] Japan .................................. 59-65898

[51] Int. Cl.$^5$ ............................................ F16D 45/02
[52] U.S. Cl. .................................... 192/3.3; 192/106.2
[58] Field of Search ...................... 192/3.28, 3.29, 3.3, 192/3.31, 3.32, 3.33, 106.2

[56] References Cited

U.S. PATENT DOCUMENTS

| | | | |
|---|---|---|---|
| 2,824,631 | 2/1958 | DeLorean | 192/3.3 |
| 3,966,031 | 6/1976 | Peterson, Jr. et al. | 192/3.3 |
| 3,966,032 | 6/1976 | Koivunen | 192/3.3 |
| 3,972,397 | 8/1976 | Cheek | 192/3.3 |
| 3,977,502 | 8/1976 | Chana | 192/3.3 |
| 4,002,228 | 1/1977 | Borman | 192/3.3 |
| 4,222,476 | 9/1980 | LeBrise | 192/106.2 |
| 4,560,043 | 12/1985 | Murasugi et al. | 192/3.31 |

FOREIGN PATENT DOCUMENTS

| | | | |
|---|---|---|---|
| 0066367 | 12/1982 | European Pat. Off. | 192/3.29 |
| 2125932 | 3/1984 | United Kingdom | 192/106.2 |
| 2130311 | 5/1984 | United Kingdom | 192/3.29 |

Primary Examiner—Richard M. Lorence
Attorney, Agent, or Firm—Foley & Lardner, Schwartz, Jeffery, Schwaab, Mack, Blumenthal & Evans

[57] ABSTRACT

A clutch-slip control arrangement for a lock-up torque converter includes an orifice which is variable in opening in response to relative rotation or relative axial movement of a turbine hub and an output hub. In accordance with the present invention, a friction member is interposed between the turbine hub and the output hub for changing a performance characteristic of the orifice in such a manner that an orifice opening characteristic is different from an orifice closing characteristic.

5 Claims, 6 Drawing Sheets

LOCK-UP TORQUE CONVERTER WITH AN IMPROVED CLUTCH-SLIP CONTROL ARRANGEMENT

BACKGROUND OF THE INVENTION

1. Field of the Invention

The present invention relates in general to lock-up torque converters and more particularly to improvements in clutch-slip control arrangements thereof.

2. Description of the Prior Art

A lock-up torque converter has two operation modes, i.e., an operation mode (converter state) in which an input element (usually a pump impeller) is driven by an engine to circulate working fluid which in turn drives under the reaction of a stator (reaction element) an output element (usually turbine runner) with an increased torque and another operation mode (lock-up state) in which a lock-up clutch is engaged to drivingly interconnect the input and output elements and thereby directly transmit a torque from the input element to the output element, and is adapted to take the former operation mode at a relatively low engine rpm range where the engine encounters an engine rpm variation problem and a requirement of torque increase and the latter operation mode at the remainder of the engine rpm range. Accordingly, the lock-up torque converter can reduce, as compared with the common torque converter having the former operation mode only, the engine fuel consumption by the amount corresponding to an reduction in slip between the input and output elements at a high engine rpm range (high vehicle speed range).

However, in the lock-up torque converter of the kind adapted to take the above two operation modes only, a lock-up vehicle speed at which engagement or disengagement of the lock-up clutch is performed must be set to a considerably high value so that upon engagement or disengagement of the lock-up clutch the resulting engine torque variation becomes small enough not to cause any vibrations of the vehicle body, resulting in that a lock-up operation range in which the lock-up clutch is held engaged is too narrow to reduce the engine fuel consumption to a satisfactory extent.

In order to solve the above problem, as is disclosed in U.S. Pat. Nos. 3,966,031 and 4,002,228, a clutch slip control technique has been proposed, which still encounters the engine rpm variation problem to some extent, wherein at a certain low engine rpm range in which an engine output torque is sufficiently large, the lock-up clutch is brought into slipping engagement while being limited for slip so that the engine torque variation is so small as to be negligible.

The clutch-slip control arrangements disclosed in the above mentioned U.S. Patents are provided with a variable opening orifice of which the opening is determined depending upon a force (turbine torque or differential pressure on opposite sides of turbine runner) variable with variation of a slip between the input and output elements of the torque converter, whereby a lock-up release pressure is varied to change an engagement force of the lock-up clutch, which clutch is actuated by the differential pressure between the lock-up release pressure and the pressure within the torque converter (converter pressure), so that the above mentioned slip is adjusted to a suitable value.

However, the above mentioned kind of clutch slip control arrangement has a problem that the clutch slip control effected thereby is unstable for the reason as will be described hereinafter. Description of the reason being made with reference to the U.S. Pat. No. 4,002,228 in which the turbine torque is utilized as the aforementioned force for determining the opening of the variable opening orifice and the turbine torque T varies in such a relation to the clutch slip "s" as shown in FIG. 11, so that upon occurrence of slip variaton $\Delta s$ the turbine torque is caused to vary by the amount of $\Delta T$. On the other hand, the variation characteristic of the opening S of the orifice in relation to the turbine torque T is represented by the line "a" in FIG. 12. The inclination of the line "a" is determined depending upon the spring constant of springs disposed between two relatively rotatable members on the turbine side and the output side in such a manner as to resist the relative movement thereof and is set so that a suitable slip amount (slip amount of 60 rpm when the rotation of the torque converter output shaft is 1000 rpm) is obtained. In FIG. 12, the line "b" represents the variation characteristic of the lock-up release pressure $P_L$ in relation to the opening of the variable opening orifice S.

Now description being made to the case in which a turbine torque variation as represented by $\Delta T$ in FIG. 11 occurs, such an opening variation of the variable opening orifice as is represented by $\Delta S_1$ in FIG. 12 occurs respondingly, so that the resulting lock-up release pressure variation becomes so large as is represented by $\Delta P_1$ in the same figure. On the other hand, the feed back amount of the clutch-slip control arrangement varies as a function of $\Delta P_1/\Delta T$, so that when $\Delta P_1$ is so large as above, the feed back amount becomes excessively large. In the meantime, the clutch-slip control arrangement delays in operation in such a manner as to cause variation of the lock-up release pressure $\Delta P_1$ with a responsive delay $T_1$ and an action delay $T_2$ as shown in FIG. 14, so that in the case where the feed back amount is so large as mentioned above, the rotational speed of the torque converter input element as represented by the curve "c" in FIG. 13 varies largely relative to the rotational speed of the torque converter output element as represented by the curve "d", causing the slip amount represented by the difference in rotational speed between the input and output elements to hunt and thus making the slip control unstable.

In order to solve this problem, it is considered that the spring constant of the aforementioned springs is increased for thereby making the inclination of the opening degree variation characteristic "a" of the variable opening orifice steeper as represented by the line "a'" in FIG. 12. When this is the case, the opening degree variation $\Delta S_2$ of the variable opening orifice in response to a given variation $\Delta T$ of the turbine torque is made smaller and therefore a lock-up release pressure variation $\Delta P_2$ for a given turbine torque variation $\Delta T$ is made smaller, causing the feed back coefficient $\Delta P_2/\Delta T$ to become smaller. It therefore becomes possible to prevent hunting of the rotational speed of the torque converter input element and make the clutch slip control stable. However, when this is the case, the slip amount becomes too large (e.g. 200 rpm) and is largely deviated from a suitable value, thus making it impossible to attain a desired clutch-slip control.

SUMMARY OF THE INVENTION

In accordance with the present invention, there is provided an improved clutch-slip control arrangement for a lock-up torque converter. The clutch-slip control arrangement has an orifice which is variable in opening in accordance with variation of a force responsive to a slip between an input element and an output element of the lock-up torque converter. Such a variable orifice substantially follows the conventional fashion.

In accordance with the present invention, the clutch-slip control arrangement is provide with means for changing a performance characteristic of the orifice in such a manner that an orifice opening characteristic is different from an orifice closing charcteristic. Without such changing means, the orifice opening characteristic coincides with the orifice closing characteristic.

In one embodiment, the changing means comprises a friction member interposed between axialy opposed surfaces of a turbine hub and an output hub to provide a frictional resistance to relative rotation between the same.

The above structure is effective for solving the above noted problem inherent in the prior art arrangement.

It is accordingly an object of the present invention to provide an improved lock-up torque converter which can solve the above noted problem inherent in the prior art device.

It is a further object of the present invention of the aforementioned character which is practically quite useful though so simple in structure.

It is a yet further object of the present invention of the aforementioned character which is readily adoptable to current lock-up torque converters of the aforementioned kind.

BRIEF DESCRIPTION OF THE DRAWINGS

The features and advantages of the lock-up torque converter according to the present invention will become more clearly appreciated from the following description taken in conjunction with the accompanying drawings, in which.

DETAILED DESCRIPTION OF THE PREFERRED EMBODIMENTS

Figure 1:
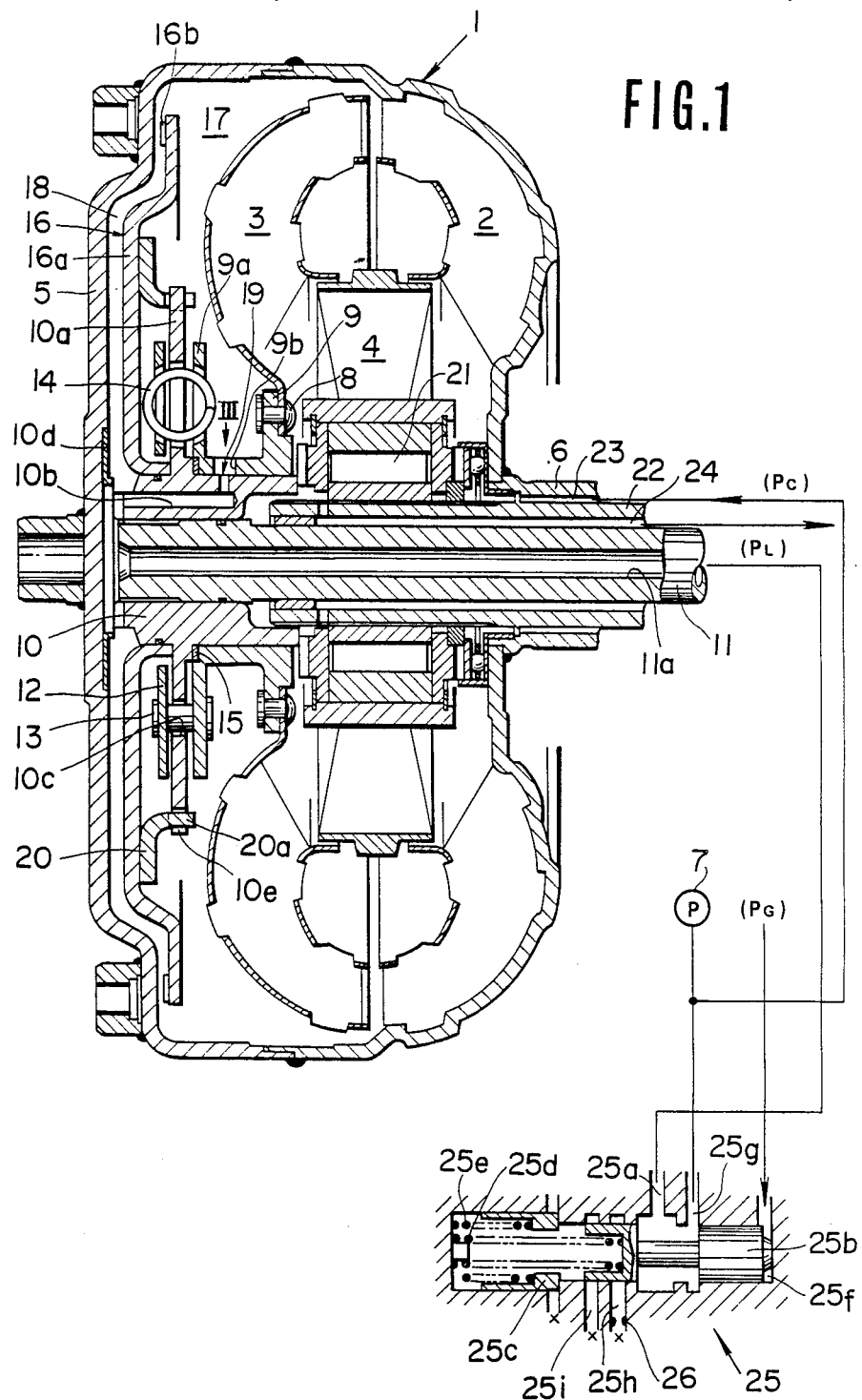
FIG. 1 is a sectional view of a lock-up torque converter equipped with an improved clutch-slip control arrangement according to an embodiment of the present invention.

Referring to FIG. 1, a lock-up torque converter is illustrated which comprises a torque converter indicated generally by the reference numeral 1. The torque converter 1 includes a pump impeller (torque converter input element) 2, a turbine runner (torque converter output element) 3 and a stator 4. The pump impeller 2 is welded or otherwise secured to a converter cover or input shell 5 and drivingly connected therethrough to an output shaft of a prime mover, such as a crankshaft of an internal combustion engine, not shown, so that the pump impeller 2 is driven to rotate at all times when the engine is in operation. The pump impeller 2 is also welded or otherwise secured to a hollow pump drive shaft 6 and is adapted to drive therethrough a pump 7 at all times when the engine is in operation. The pump impeller 2 cooperates with the input shell 5 to form an enclosed fluid space (no numeral) therebetween.

Figure 2:
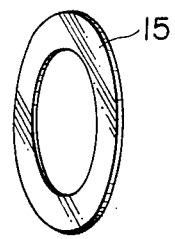
FIG. 2 is a perspective view of a friction plate utilized in the clutch-slip control arrangement of FIG. 1.

The turbine runner 3 is rivetted or otherwise secured to a turbine hub 9 rotatably coupled on a sleeve or an output hub 10 which is in turn splined, in an axially unmovable manner, to a torque converter output shaft 11 so that the output hub 10 constitutes part of the torque converter output shaft 11. The turbine runner 3 is disposed in the enclosed space and cooperates with the pump impeller 2 to form a toroidal circuit. The turbine hub 9 and the output hub 10 are respectively formed with integral radially outward flanges 9a and 10a which are opposite axially to each other. On the side of the flange 10a opposite to the flange 9a side thereof, there is disposed an annular plate 12. The flange 9a and the annular plate 12 are secured to each other by rivets 13 which are loosely fitted in corresponding holes 10c of the flange 10a so as to allow relative rotation between the flanges 9a and 10a and therefore between the turbine hub 9 and the output hub 10. The flanges 9a, 10a and the annular plate 12 are formed with plural sets of spring receiving openings, not designated, which sets of openings are alignable to respectively receive therein springs 14, though only one set of spring receiving openings and only one spring 14 are shown in the drawing. The springs 14 normally hold the turbine hub 9 and the output hub 10 at positions thereof where there is no relative rotation between the turbine hub 9 and the output hub 10 and are compressed increasingly as relative rotation between the turbine hub 9 and the output hub 10 increases. Between the turbine hub 9 and the output hub 10 there is disposed a friction plate 15 which provides frictional resistance to relative rotation between the turbine hub 9 and the output hub 10. The friction plate 15 is annular in shape as shown in FIG. 2.

Figure 3:
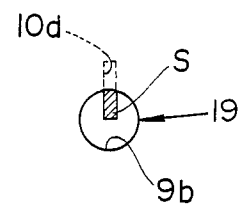
FIG. 3 is a view taken along the arrow III in FIG. 1.

Between the turbine runner 3 and the input shell 5 there is disposed a lock-up clutch 16 which includes a clutch piston 16a slidably mounted on the output hub 10 in a manner to define, when the clutch piston 16a frictionaly engages at its outer friction surface 16b with the input shell 5, a converter chamber or engagement chamber 17 between the clutch 16 and the turbine runner 3 and a lock-up control chamber or disengagement chamber 18 between the clutch 16 and the input shell 5. The disengagement chamber 18 is communicated with the engagement chamber 17 through an axial hole 10b and a radial slit 10d which are formed in the output hub 10 and through a radial hole 9b formed in the turbine hub 9. The hole 9b and the slit 10d are adapted to constitute, as shown in detail in FIG. 3, a variable opening orifice 19 which is variable in opening S depending upon the overlapping amount of the hole 9b and the slit 10d or controlling fluid communication between the engagement and disengagement chambers 17 and 18 in accordance with the degree of opening S thereof.

The clutch piston 16a has secured thereto an annular L-like cross sectional mounting member 20 which is formed at the free end thereof with a plurality of teeth 20a in engagement with corresponding teeth 10e formed in the outer periphery of the flange 10a of the output hub 10 so that the clutch piston 16a is drivingly connected to the output hub 10 in a manner to be axially movable relative thereto.

The stator 4 of the torque converter 1 is mounted via a one-way clutch 21 on a hollow stationary shaft 22, which shaft 22 cooperates with the pump drive shaft 6 and the torque converter output shaft 11 to define therebetween annular passages 23 and 24, respectively. The annular passage 23 conveys working fluid from the pump 7 to the engagement chamber 17, which working fluid is then discharged through the annular passage 24. Though not shown in the drawing, there is disposed in a fluid passage in communication with the passage 24 a valve for maintaining the fluid pressure in the engagement chamber 17 or the inside of the torque converter 1 above a predetermined value $P_C$.

The disengagement chamber 18 is in communication with an axial bore 11a of the torque converter output shaft 11 with a communication port 25a of a lock-up control valve 25. The lock-up control valve 25 consists of a spool 25b, a plug 25c and springs 25d, 25e for biasing the spool and the plug rightwardly in the drawing. The spool 25b is caused to stroke to the left or right in the drawing in response to variation of a governor pressure $P_G$ which is supplied to a chamber 25f and variable in proportion to vehicle speed, to selectively connect the communication port 25a to an inlet port 25g, a drain port 25h having a fixed orifice 26 or a drain port 25i. The inlet port 25g is in constant communication with the engagement chamber 17 so as to be supplied with the fluid pressure therein.

The operation of the lock-up torque converter structured as above will be described hereinafter.

Figure 5:
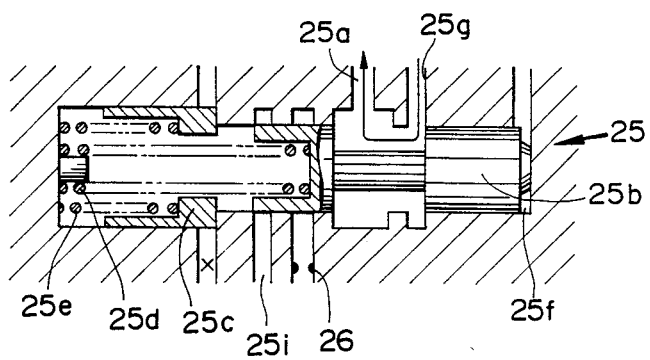

Upon low speed running of the vehicle, i.e., when the vehicle is running at a speed lower than a predetermined low value, the governor pressure $P_G$ cannot cause the spool 25b to stroke against the bias of the spring 25d but allows the control valve 25 to assume the operative position shown in FIGS. 1 and 5. When this is the case, the fluid pressure $P_C$ in the engagement chamber 17 is supplied through the port 25g, 25a and the axial bore 11a to the engagement chamber 18, thus making equal to each other the lock-up release pressure or the fluid pressure $P_L$ in the disengagement chamber 18 and the fluid pressure $P_C$ in the engagement chamber 17. Due to this, the lock-up clutch 16 is held in a disengaged position shown in FIG. 1, thus allowing the lock-up torque converter to operate under a converter state in which input torque is transmitted entirely through the torque converter 1 in a well known manner.

Figure 6:
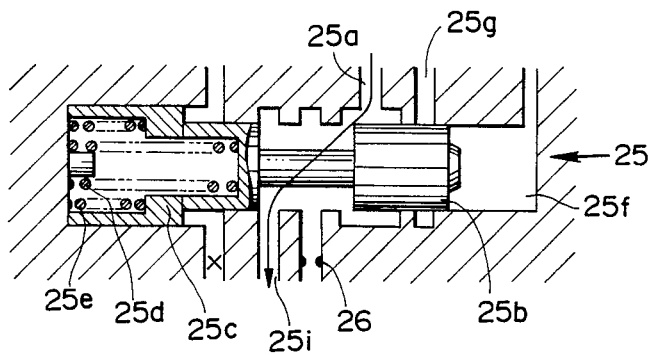

Upon high speed running of the vehicle, i.e., when the vehicle is running at a speed higher than a predetermined high value, the governor pressure $P_G$ causes the spool 25b to move against the bias of the spring 25d and also the spring 25e, allowing the lock-up control valve 25 to assume an operative position shown in FIG. 6. When this is the case, the lock-up release pressure $P_L$ in the disengagement chamber 18 becomes equal to the atmospheric pressure since the disengagement chamber 18 is communicated through the axial bore 11a with the communication port 25a and the drain ports 25h, 25i. Due to this, the fluid pressure $P_L$ in the engagement chamber 17 causes the clutch piston 16a to move leftwardly in the drawing to be pressed at the friction surface 16a against the input shell 5, thus allowing the lock-up torque converter to operate under a lock-up state in which input torque is transmitted entirely through the clutch 16, i.e., input torque applied upon the input shell 5 is transmitted to the torque converter output shaft 11 through the lock-up clutch 16 of which the slip amount is maintained zero.

Figure 4:
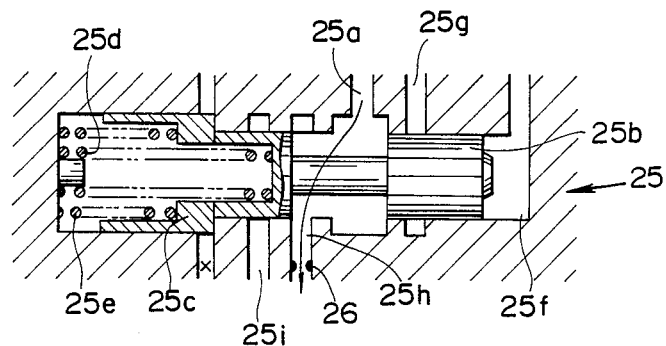
FIGS. 4 through 6 are views showing a lock-up control valve of FIG. 1 in its various operative positions.

Upon medium speed running of the vehicle, i.e., when the vehicle is running at a speed intermediate between the aforementioned high and low values, the governor pressure $P_G$ causes the lock-up control valve 25 to assume the operative position shown in FIG. 4. When this is the case, the disengagement chamber 18 is vented through the fixed orifice 26 and at the same time supplied with the fluid pressure $P_C$ in the engagement chamber 17 through the variable opening orifice 19. The fluid pressure $P_L$ in the disengagement chamber 18 is thus determined by the opening degree S of the variable opening orifice 19 and allows the lock-up clutch 16 to be brought into slipping engagement at the slip rate proportional to the intensity of the fluid pressure $P_L$. The lock-up torque converter is thus put into an operative state in which input torque is transmitted partly through the clutch 16 and partly through the torque converter 1, or in other words, part of input torque is transmitted through the clutch 16 and the remainder of the input torque is transmitted through the torque converter 1.

Figure 10:
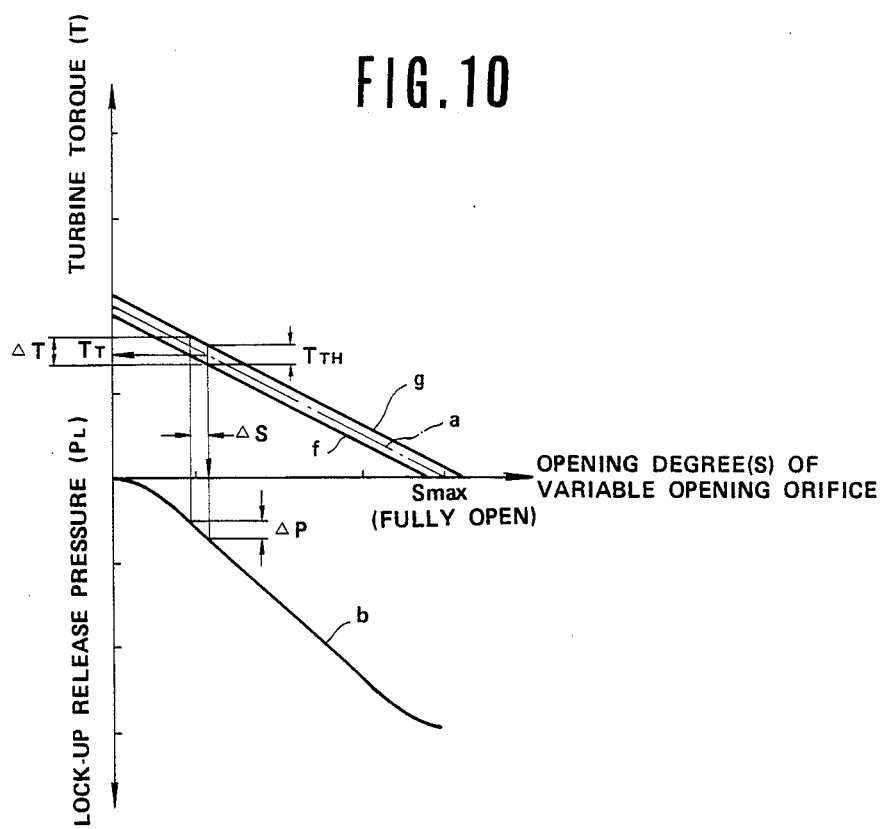
FIG. 10 is a graph showing a performance characteristic of the clutch-slip control arrangement of FIG. 1.
Figure 11:
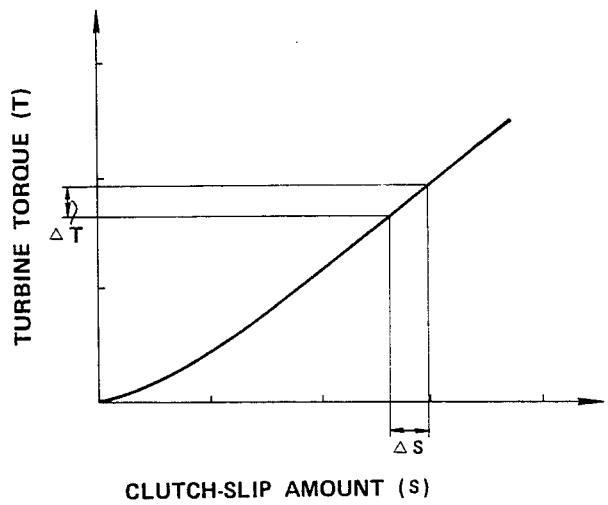
FIG. 11 is a graph showing a clutch-slip amount of a lock-up torque converter as a function of a turbine torque.
Figure 12:
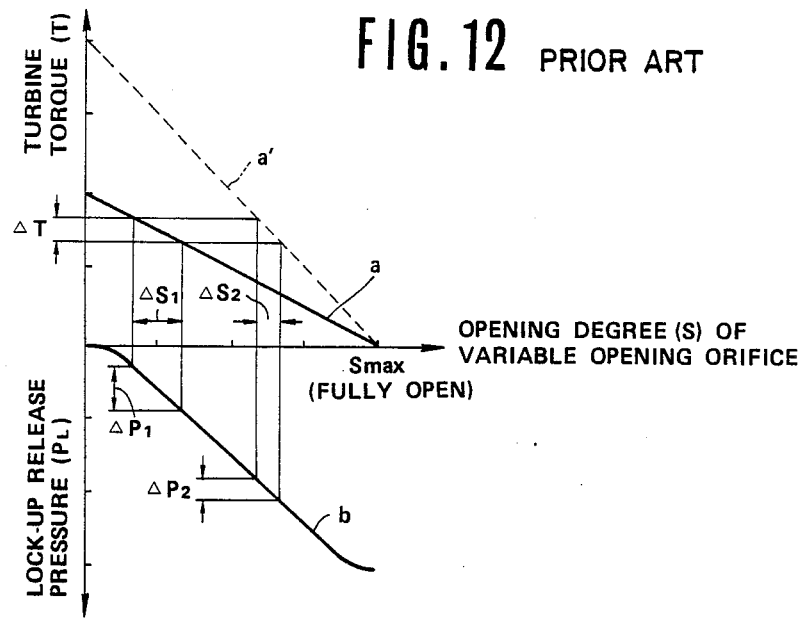
FIG. 12 is a graph showing a performance characteristic of a prior art lock-up torque converter.
Figure 13:
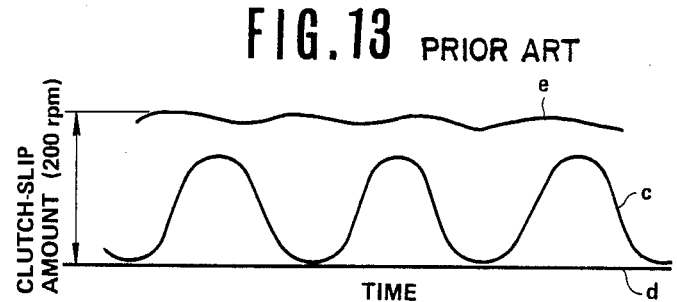
FIG. 13 is a motion-time chart showing a clutch-slip variation of a prior art of a prior art lock-up torque converter.
Figure 14:
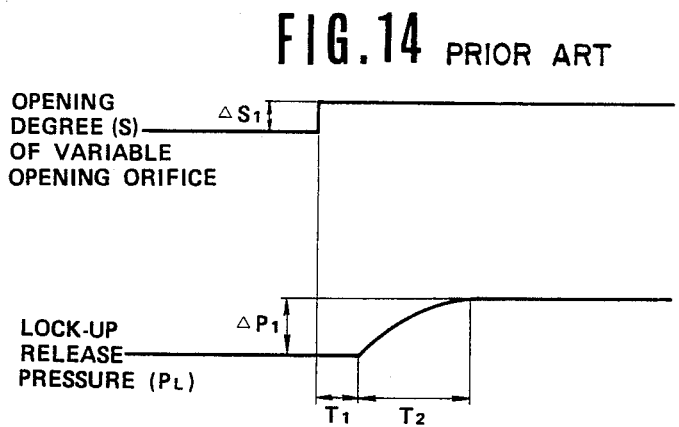
FIG. 14 is a motion-time chart showing a delay in variation of a release pressure in a prior art lock-up torque converter in response to variation of opening degree of a variable opening orifice.

Now when the springs 14 are designed so that the relation between the turbine torque T and the relative rotation between the turbine hub 9 and the output hub 10 (opening degree S of the variable opening orifice 19) is represented by the line "a" in FIG. 10 similarly to the case of the prior art device shown in FIG. 12, the variable opening orifice 19 is given such an orifice opening characteristic as is represented by the line "f" in FIG. 10 and such an orifice closing characteristic that is represented by the line "g" in the same figure since the above mentioned relative rotation between the turbine 9 and the sleeve 10 is subject to frictional resistance due to the provision of the friction plate 15. The orifice opening and closing characteristics of the variable opening orifice 19 thus differ from each other to provide a hysteresis (hysteresis torque $T_{TH}$) therebetween.

Thus, when the turbine torque T is of the value $T_T$ and varies within the range of the hysteresis torque $T_{TH}$, the opening degree S of the variable opening orifice 19 does not vary. Further, since opening variation $\Delta S$ of the orifice 19 and therefore fluid pressure variation $\Delta P$ in the disengagement chamber 18 for a given turbine torque variation $\Delta T$ becomes sufficiently smaller as compared with the corresponding fluid pressure variation $\Delta P_1$ in FIG. 12, the feed back coefficient $\Delta P/\Delta T$ (feed back amount) becomes sufficiently smaller. By this, when the spring constant of the springs 14 is made sufficiently smaller to attain a suitable slip amount of the clutch 16, the slip amount does not hunt but is maintained at a suitable value. Accordingly, the lock-up torque converter according to the present invention makes it possible to prevent hunting of the slip amount and repeating engine booming sound caused thereby without making the slip amount excessively large.

Figure 7:
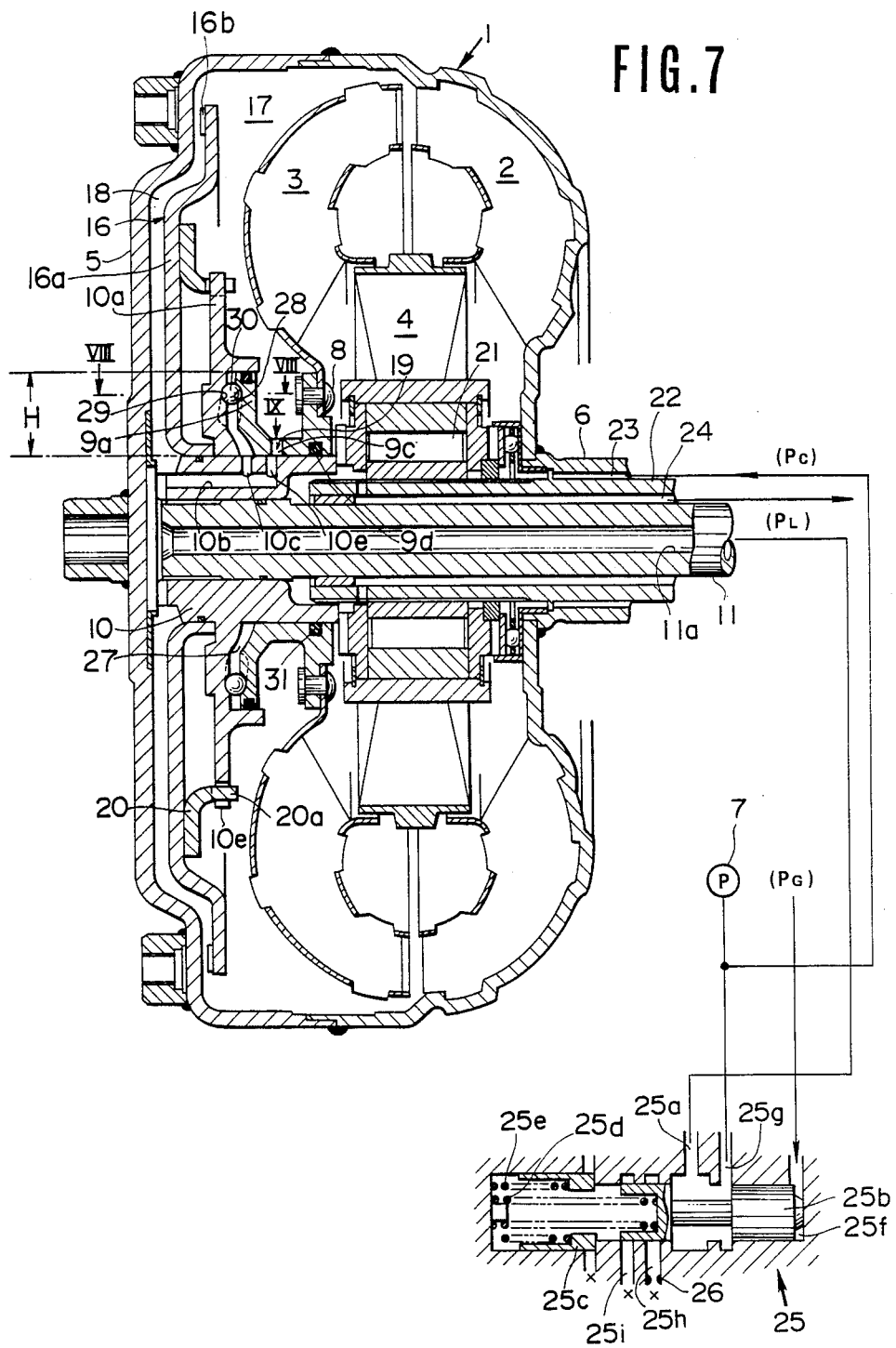
FIG. 7 is a view similar to FIG. 1 but showing a modification according to the present invention.

FIG. 7 shows another embodiment in which the present invention is applied to a slip control arrangement adapted to maintain the ratio of the amount of torque transmitted by the lock-up torque converter 16 to the amount of torque transmitted by the turbine runner 3 (turbine torque) at the constant value. In this embodiment, the flange 9a is slidably mounted in the flange 10a to define therebetween a chamber 27. The flanges 9a and 10a are provided with plural pairs of arcuated grooves 28 and 29. Each pair of grooves 28 and 29 are respectively formed in the opposing surfaces of the flanges 9a and 10a in such a manner as to extend, while facing to each other, along a circle having a radius R and a center coincident with the center axis of the torque converter output shaft 11. The pairs of grooves are thus arranged in a circular array. As shown in detail in FIG. 8, each pair of ball receiving grooves 28 and 29 have bottom surfaces 28a and 29a which are flat and parallel to each other but are inclined relative to a plane of rotation of the flanges 9a and 10a in a manner to make an angle with the same. In other words, each arcuated groove 28 or 29 has circumferentially opposed ends and is shallower at one circumferential end and deeper at the other circumferential end. There is disposed in each set of grooves 28 and 29 a ball 30 which is held compressedly therebetween but in a movable manner to constitute a cam mechanism.

Figure 9:
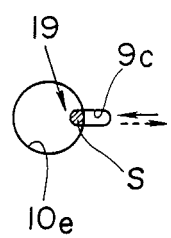
FIG. 9 is a view taken along the arrow IX in FIG. 7.

The lock-up control chamber or disengagement chamber 18 is in constant communication with a fluid pressure chamber 27 through holes 10b and 10c formed in the output hub 10 and in varying communication with the converter chamber or disengagement chamber 17 through the holes 10b and 10e formed in the output hub 10 and the axial slit 9c formed in the turbine hub 9. The slit 9c and the hole 10e are adapted to constitute, as shown in FIG. 9, a variable opening orifice 19 which is variable in opening degree S depending upon the overlapping amount of the slip 9c and the hole 10e for controlling communication between the engagement and disengagement chambers 17 and 18 in accordance with the opening degree S.

In accordance with the present invention, there is disposed between the sliding portions of the turbine hub 9 and the output hub 10, a friction ring 31 which is received in a groove 9d formed in the sliding portion of the turbine hub 9 and adapted to provide a frictional resistance to relative rotation between the turbine hub 9 and the output hub 10.

Upon low speed running or high speed runing of the vehicle, the lock-up torque converter 1 operates under the converter state or lock-up state similarly to the previous embodiment due to the aforementioned operation of the lock-up control valve 25.

Upon medium speed running of the vehicle in which the lock-up control valve 25 is put into an operative position shown in FIG. 4, the disengagement chamber 18 is vented through the fixed orifice 26 and at the same time supplied with the fluid pressure $P_C$ in the engagement chamber 17 through the variable opening orifice 19. The fluid pressure $P_L$ in the disengagement chamber 18 is thus determined by the opening degree S of the variable opening orifice 19 and allows the lock-up clutch 16 to be brought into slipping engagement at the slip rate proportional to the intensity of the fluid pressure $P_L$. The lock-up torque converter is thus put into an operative state intermediate between the converter state and the lock-up state, i.e, an operative state in which input torque is transmitted partly through the clutch 16 and partly through the converter 1.

Figure 8:
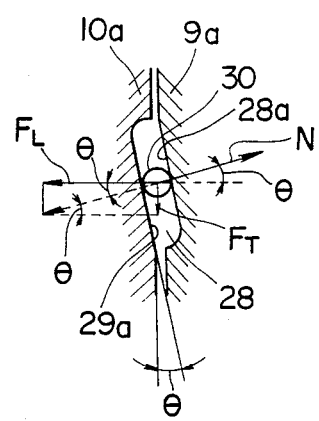
FIG. 8 is a developed sectional view taken along a curved surface indicated by VIII—VIII in FIG. 7.

Description being made to the forces acting on the turbine hub 9, the turbine hub 9 receives a force $F_T$ due to a torque $T_T$ exerted on the turbine runner 3 and a force $F_L$ caused by the differential pressure between the engagement and disengagement chambers 17 and 18, which differential pressure acts on an effective area H of the turbine hub 9 within the chamber 27. A frictional force of the turbine hub 9 relative to the ball 30 is negligible. The resultant force $F_T$ and the force $F_L$ is in balance with a reaction force N of the ball 30, as shown in FIG. 8. The forces $F_T$ and $F_L$ are given by:

$$F_T = T_T/R \tag{1}$$

and $$F_L = (P_C - P_L) \times H \tag{2}$$

respectively. In the equilibrium state, the force $F_T$ is equal to $N \sin \theta$, and the force $F_L$ is equal to $N \cos \theta$. Therefore, the following equation is obtained;

$$F_L \tan \theta = F_T \tag{3}$$

A torque $T_L$ transmitted through the lock-up clutch 16 is given by $$T_L = K(P_c - P_L) \tag{4}$$

where K is a constant determined by the effective area and the radius of the lock-up clutch 16. From the equations (1) to (3), we can obtain $$T_L \times \frac{H}{K} \tan \theta = \frac{T_T}{R}.$$

Therefore, the relation between the torques $T_L$ and $T_T$ is written as $$T_L = \frac{1}{R \tan \theta} \times T_T.$$

The quantity $$\frac{K}{H} \times \frac{1}{R \tan \theta}$$

is a constant because all of the quantities K, H, R, $\theta$ have fixed values. Thus, the following equation is obtained:

$$T_L = K \times T_T \tag{5}$$

where $$K = \frac{K}{H} \times \frac{1}{R \tan \theta} = \text{constant.}$$

From the equation (5), it will be understood that the clutch torque $T_L$ is proportional to the turbine torque $T_T$.

If the turbine torque $T_T$ increases to disturb an equilibrium state of the turbine hub 9, the turbine hub flange 9a rotates relative to the sleeve flange 10a in the direction to cause the ball 30 to move downward in FIG. 8.

When this is the case, the turbine hub 9 is caused to move rightward in the drawing by the effect of the aforementioned cam mechanism provided by the bottom surfaces 28a and 29a of the ball receiving grooves 28 and 29. This axial movement of the turbine hub 9 causes the slit 9c to move rightward as indicated by the broken line arrow in FIG. 9 for thereby decreasing the opening degree S of the variable opening orifice 19. By this, less fluid pressure is admitted from the engagement chamber 17 to the disengagement chamber 18. Therefore, the fluid pressure in the disengagement chamber 18 is decreased so as to re-establish the relation of the equation (5) since the fluid pressure is drained through the fixed orifice 26 at a constant rate.

Reversely, if the turbine torque $T_T$ decreases to disturb an equilibrium state of the turbine hub 9, the turbine hub flange 9a rotates relative to the sleeve flange 10a in the direction to cause the ball 30 to move upward in FIG. 8. When this is the case, the turbine hub 9 is caused to move leftward in the drawing. This axial movement of the turbine hub 9 causes the slit 9c to move leftward as indicated by the solid line arrow in FIG. 9 for thereby decreasing the opening degree S of the variable opening orifice 19. By this, more pressure is admitted from the engagement chamber 17 to the disengagement chamber 18 through the variable opening orifice 19. As a result, the fluid pressure in the disengagement chamber 18 is increased so that the equation (5) is re-established.

By the repetition of such operations, the opening degree of the variable opening orifice 19 is controlled in a manner to vary with variation of the turbine torque $T_T$ during the above mentioned clutch-slip control, whereby to control the fluid pressure in the disengagement chamber 18 and therefore the engagement force of the lock-up clutch 16 in such a manner that the ratio of the turbine torque $T_T$ to the torque $T_L$ transmitted through the clutch 16 is maintained at a constant value as expressed by the equation (5).

During the above clutch-slip control, the friction ring 31 provides a frictional resistance to relative movement between the turbine hub 9 and the sleeve 10, whereby to provide a hysteresis between the opening and closing characteristics of the variable opening orifice 19 similarly to the previous embodiment. This embodiment therefore can produce substantially the same effect as the previous embodiment.

While the present invention has been described and shown with respect to a clutch-slip control arrangement of the type in which clutch slip amount is controlled in accordance with turbine torque, the present invention can be applied to a clutch-slip control arrangement of the type in which the clutch slip amount is controlled in accordance with the differential pressure on opposite sides of a turbine runner.

What is claimed is:

1. A clutch-slip control arrangement for a lock-up torque converter having an input element and an output element, comprising:
   an orifice having an opening amount which varies in accordance with a variation of a for which is responsive to a slip between the input and output elements; and
   means for changing a performance characteristic of said orifice in such a manner that the opening amount of said orifice for a given level of said force while said opening amount is increasing differs from the opening amount of said orifice at said given level of force while said opening amount is decreasing.

2. A clutch-slip control arrangement as set forth in claim 1, further comprising a pair of relatively movable members between which relative movement causes variation of opening of said orifice, and in which said changing means comprises a friction member interposed between said relatively movable members in a manner to provide a frictional resistance to relative movement between the same.

3. A lock-up torque converter comprising:
   a torque converter including an input shell, a pump impeller secured to said input shell and cooperating therewith to form an enclosed space, a turbine runner disposed in said enclosed space and cooperating with said pump impeller to form a toroidal circuit, a turbine hub secured to said turbine runner, an output hub movable relative to said turbine hub and spring means for providing a drive connection between said output hub and said turbine hub;
   a fluid operated friction clutch disposed between said turbine runner and said input shell to define an engagement chamber between said clutch and said turbine runner and a disengagement chamber between said clutch and said input shell;
   orifice means disposed between said engagement chamber and said disengagement chamber and having an opening amount which is variable in response to relative movement between said turbine hub and said output hub for controlling fluid communication between said engagement chamber and said disengagement chamber for thereby controlling torque transmission through said clutch; and
   means for changing a performance characteristic of said orifice means in such a manner that the opening amount of said orifice means varies differently when said opening amount is increasing than when said opening amount is decreasing.

4. A lock-up torque converter as set forth in claim 3, in which said turbine hub and said output hub have a pair of axially opposed surfaces, said changing means comprising a friction member interposed between said axially opposed surfaces of said turbine hub and said output hub to provide a frictional resistance to relative movement between the same.

5. A lock-up torque converter as set forth in claim 3, in which said turbine hub and said output hub have a pair of circumferentially opposed surfaces, said changing means comprising a friction member interposed between said circumferentially opposed surfaces of said turbine hub and said output hub to provide a frictional resistance to relative movement between the same.

* * * * *